United States Patent [19]

Bouchal

[11] Patent Number: 4,637,799

[45] Date of Patent: Jan. 20, 1987

[54] SYSTEM AND GAME THAT STIMULATES CREATIVE AND VERBAL EXERCISE

[76] Inventor: Robert A. Bouchal, 48 Liberty Ave., Somerville, Mass. 02144

[21] Appl. No.: 325,285

[22] Filed: Nov. 27, 1981

Related U.S. Application Data

[63] Continuation of Ser. No. 147,201, May 6, 1980, abandoned, which is a continuation-in-part of Ser. No. 901,132, Apr. 28, 1978, abandoned, which is a continuation-in-part of Ser. No. 727,395, Sep. 29, 1976, abandoned.

[51] Int. Cl.[4] ............................ G09B 1/34; A63F 1/00
[52] U.S. Cl. ...................................... 434/236; 273/292
[58] Field of Search ............... 434/156, 157, 236, 237; 273/146, 292

[56] References Cited

U.S. PATENT DOCUMENTS

| | | | |
|---|---|---|---|
| 1,379,871 | 5/1921 | McGuire | 273/292 |
| 3,871,115 | 3/1975 | Glass et al. | 434/157 |
| 3,891,209 | 6/1975 | Kritzberg | 434/236 |
| 4,015,850 | 4/1977 | Russell | 273/146 |

OTHER PUBLICATIONS

*Exceptional Children*, May 1970, p. 686.
*Development Learning Materials*, 1976, pp. 47 and 80.
*Teaching Resources Catalog*, 1979, p. 35.

*Primary Examiner*—William H. Grieb
*Attorney, Agent, or Firm*—Herbert L. Gatewood

[57] ABSTRACT

Matrix of discrete visual representations are presented either as individual cards to be arranged in some pattern, or in a predetermined, fixed arrangement with respect to one another. In the first matrix, a subject arranges a base group of cards presented to him, these cards bearing representations which is a group display examples of the same concept between at least next adjacent cards and which can be arranged in a logical sequence, and then verbalizes what that arrangement means. Cards in succeeding additional groups presented are not logically related to one another as a group, however, certain cards in each additional group have a logical connection to certain cards making up a preceding group. The subject can substitute cards logically connected into the predetermined pattern, making up a new story about what the new pattern means. The process continues until the last group of cards from the matrix has been presented to the subject, and these have been arranged by the subject into a new pattern, and a story told. With the fixed matrix, a subject throws coded dice, determining discrete visual representations in the fixed matrix. Thus, a random pattern exists. As before, the subject verbalizes about what that arrangement means.

The matrices can be used in playing a game involving telling a story within a certain time. The type of story to be told can be determined by random selection from a predetermined listing. The story can be scored for the accumulation of points toward winning.

2 Claims, 9 Drawing Figures

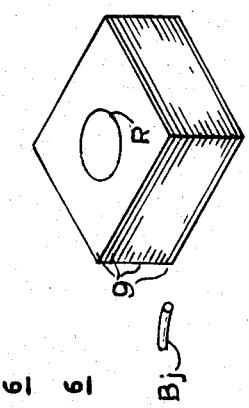
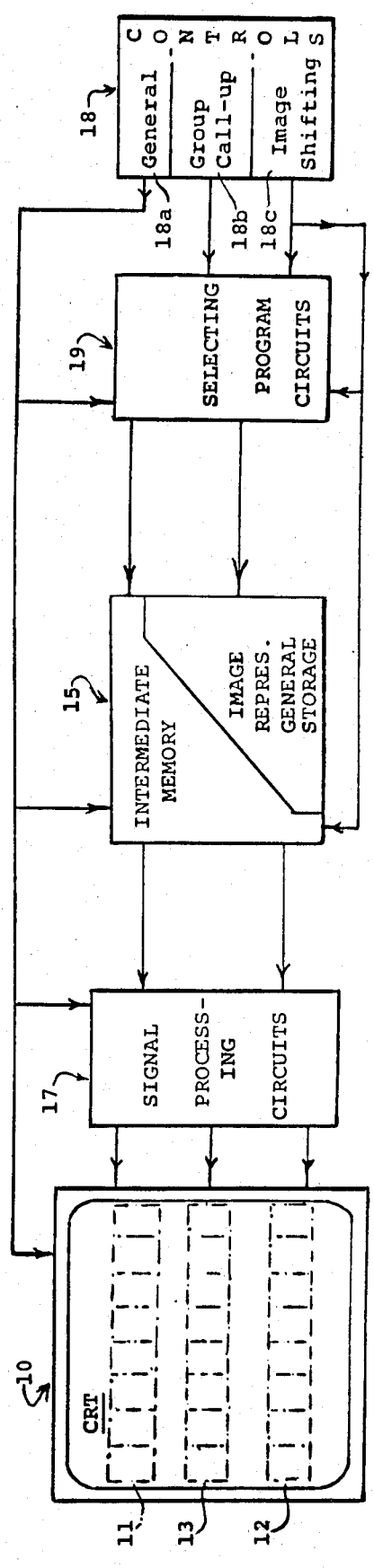

SYSTEM AND GAME THAT STIMULATES CREATIVE AND VERBAL EXERCISE

CROSS-REFERENCE TO RELATED APPLICATIONS

This is a continuation of application Ser. No. 06/147,201, filed May 6, 1980, now abandoned, and entitled "System and Game That Stimulates Creative, Verbal and Visual Exercise, which is a continuation-in-part of my earlier filed application Ser. No. 05/901,132, filed Apr. 28, 1978, now abandoned, which in turn, is a continuation-in-part of my prior application Ser. No. 05/727,395, filed Sept. 29, 1976, also abandoned, both of these applications being entitled "Visual System for Eliciting Associated Operations and Verbalization."

BACKGROUND OF THE INVENTION (1) Field of The Invention

This invention relates in general to a system of discrete, visual representations which make up a matrix-like array and which can be used alone or incorporated in a game, for stimulating creative, verbal and visual exercise.

(2) Description of The Prior Art

Visual sense and perception is a dominating part of the conscious state, and visual impressions and phantasms usually are the particularly vivid content of memory with strong associations, though the latter at times may be even unconscious. The association of an image, an idea, with a specific word by sound as heard, or sight as printed, and with the motor responses required to produce the word as the associated sound, obviously is a large part of ordinary educational processes. Hence, visual representations of persons, animals, or things have been extensively used, particularly in a child's early and developing years, as an educational tool, to develop the associations required in education processes; to develop skilled and ready motor responses; and for testing or strengthening associations already acquired. In a similar fashion, visual representations, including photographs, have been used in psychological studies; and as well for diagnostic procedures for psychological, psychoanalytical, and similar purposes.

Over the past several years, particularly, a wide variety of educational materials have become available to help stimulate a child's logical thinking and association, his sequencing of events, and communications skills. In the early school years, and even pre-school, teachers and instructors often use picture cards to aid in the development of a child's association skills and verbal expression. These are, in general, single cards showing a visual representation of some person, place or thing, e.g., the representation of a certain occupation, type of store, recreation, or sport. As a child develops, however, he is presented with not just a single card but with a plurality of cards, these cards being arrangeable in a pattern or sequence, to develop recognition of certain utilitarian concepts. Thus, as disclosed, for example, in the 1976 Catalog of "Educational Design Associates"; in "Developmental Learning Materials", 1976, and in "Exceptional Children", May 1970, at Page 683, numerous and various picture sequence cards have been developed, to demonstrate, for example, some particular activity sequence, e.g., a little boy riding a sled, or sequence involving some daily activity, e.g., a little boy or girl preparing to go to school, or to bed, or growth and seasonal sequences.

In general, these various sequencing cards are available as sets of individual cards, each card carrying a photograph or other visual representation and having some connection with one another through a story type progression. The cards are presented to a child or another person, for the exercise of arranging them in a story sequence to evoke from the subject not only the response of associating or arranging the cards in appropriate sequence, but also of narrating the story represented by the picture sequence as seen by the subject.

One such set of sequencing cards, shown in "Developmental Learning Materials", and referred to therein as "Logic Cards", involves thirty cards each depicting some visual representation of a situation in which, either or both, a young teenage boy or girl might be involved. From a thirty card set, a child may, if desired, select only certain cards which give an account of commonly-occurring situations and incidents. Or, a child or other subject may use all of the cards in the set, creating a very long and involved story.

In "Developmental Learning Materials" there is also disclosed open sequence cards. These cards provide an incomplete sequencing involving an individual single situation, the students task being to complete the sequence presented to him in an incomplete form. The story is completed by a master card which retains the structure of the sequence. The sets vary in degree of difficulty due to the number and position (beginning, middle or end) of the cards missing from the sequence. Open sequence cards help develop a child's perceptual skills, such as percieving relevant details in pictorial material, left-to-right organization, and visual memory.

In still another set of available picture sequence cards, the set includes a number of different concepts, each divided into a single sequence pattern. Thus, the set of picture sequence cards disclosed in "Exceptional Children" involves ten different concepts, each divided into four sequence patterns, e.g., in one concept, the first card showing a cow, the second the cow being milked, the third card milk being delivered, and the fourth and last sequence card shows a boy drinking the milk.

Earlier, McGuire, in U.S. Pat. No. 1,379,871 which issued May 31, 1921 disclosed a game or puzzle which comprises a set of cards each carrying a visual representation of some scene, object or descriptive matter, and being appropriately captioned. The cards were accompanied by a printed sheet suggesting the theme of the story or plot presented in the picture play depicted in the cards. By arranging the cards in the right sequence so that one scene followed another putting the sub-titles in the right place a movie story was developed. As a game, the cards in a set could be played with by a number of persons, following the usual manner of card games wherein all of the cards are dealt out to the players. The person having the first card, which as disclosed by McGuire, might be designated as such, would make the first play by throwing the card on the table. The next player would have to either produce the next card in sequence in the story or else "pass", as usual in card games. Thus, the game required not only thought and judgment as well as imagination but led to amusing mistakes. Errors in judgment in playing the wrong card (which as disclosed by McGuire was determined by reference to a key on completion of the game) counted against the player.

There is available commercially a story book entitled "Another Mix or Match Storybook" in which are presented a plurality of sets or groups of discrete visual representations, each set being based somewhat loosely on a single, different, fairy tale. Each set of visual representations is presented as a page of a book, divided into five equal parts of irregular shape, and is held in the book by a ring-like binder. Thus, the storybook is provided with what might be termed horizontal and vertical groups or rows of discrete, visual representations. The discrete representations are presented as cartoon characterizations, each being provided with a descriptive caption.

In using the "Another Mix or Match Storybook", a child can see and read a particular fairy tale by turning to any particular "page" in the book and viewing the cartoon illustrations in sequence from left-to-right, while reading the captions. However, the child can also develop his own fantasy or fairy tale, although there is no logical connection between the fairy tales presented from page-to-page, by matching up the discrete visual representations depicting one fairy tale with those of one or more others. This is accomplished by flipping over the discrete representations in the book and matching sequentially from left-to-right in any horizontal row any of the discrete representations appearing vertically, to complete a horizontal row. As a result, a new fairy tale is produced wherein none of the illustrations relate to one another but the illustrations and their captions provide amusement.

Recently there has become available so-called "Tell-a-Tale" cards which, as set forth in the description of these cards in *Teaching Resources Catalog*, 1980, at Page 59, are designed to stimulate creative writing and story telling. Each set consists of thirty six cards, which includes a certain number of cards with visual representations of persons, places, animals and things. The appealing and amusing pictures shown on the cards, which can be arranged in a variety of ways, are intended to encourage verbal expression and use of imagination.

Disclosed in the same catalog at Page 61 are flip books referred to as "Alike Because" which, according to the author, develop association and generalization skills by comparing pictures of common objects. In these books, sixteen divided pages are provided in a ring binder, each page consisting of a photograph on the left and one on the right. Any picture on the left can be paired with any picture on the right and compared for likenesses and differences, e.g., as shown in the catalog one flip book contains a picture on the left showing a motorcycle and that on the right a unicycle. However, the pictures, according to the author, can be as dissimilar as an ocean liner and a necktie.

As can be readily appreciated, the various picture and sequencing cards, storybooks, and the game such as above-described do aid to further a child's or other person's creative thinking, association, and language skills; however, even so, their use is attendant with certain limitations. The single picture cards are, of course, concerned primarily with presenting a single verbal connection or perception with a person, place or thing. And, while the sequencing cards present a greater association of ideas and concepts, they require adherence to a predetermined order or arrangement of sequence cards if a concept is to be learned "correctly" or a puzzle "solved". In the case of the sequence cards in McGuire the written matter such as sub-titles determines the order of arrangement of the cards. Thus, the players do not arrange the cards and develop a story as to the meaning of that particular arrangement, this is predetermined by the written matter provided with the game. Moreover, other than the game disclosed in McGuire, the sequencing concepts presently available for fostering learning and understanding, as well as verbal skills, of which I am aware, are generally for use by children and in an educational setting.

Most importantly, however, while the various picture and sequence cards, flip books, etc., heretofore available have aided the development of association, conceptual skills, and verbalization, none of them, of which I am aware, lend themselves to the development of bisociative thinking, the skill and strategy of bridging conceptual boundaries that is useful in both the acquisition and processing of information. Instead, they seek to convey specific information about utilitarian concepts or are so open ended as to be unstructured. The prior art is "realistic" even when it is dramatic; there are, moreover, and most importantly no connections between various sequences presented, even when presented as a set of different sequence cards, or as divided pages in a flip book.

SUMMARY OF THE INVENTION

In accordance with the more general aspects of my invention, there is provided a system and game that promotes conceptual flexibility and growth, bisociative thinking, and which strengthens one's creative, verbal and visual skills.

The invention in its more basic aspects comprises a matrix of a plurality of different discrete visual representations which, in one format, can be a plurality of individual cards of like-size, each of which carries a different visual representation. The matrix comprises a base group of a plurality of different discrete visual representations which, in the matrix, can be arranged in a horizontal row of members left-to-right, the next adjacent visual representations of which, and this is a critical feature of the invention, will at least be logically connected together as by, for example, a common object. Thus, a logical progression, or sequence, will be provided by the members in the base group in, e.g., left-to-right manner. The matrix also comprises a plurality of additional groups each comprising a plurality of different discrete visual representations and each of which forms in the preferred matrix an additional horizontal row, the discrete visual representations in each with those in the base group forming vertical columns. Unlike the base group, however, the discrete visual representations in each additional horizontal row need have no obvious logical connection whatever with one another. In contrast, the vertical columns are constructed such that, within a given column, each visual representation or member does share a logical connection, e.g., a common concept or object, with a member next adjacent to it vertically.

In using the system of the invention, a subject is first presented with the base group of discrete visual representations, preferably in random order. These are arranged by the subject in a pattern to suit him and he then tells, orally or in writing, what that arrangement or pattern means to him. Next, the subject is given the additional groups of discrete visual representations, these being presented in order as determined by their position in the matrix. The subject then, as he is presented with each new group of visual representations, substitutes those representations from the new group for those in the previous determined pattern or sequence with which their is a logical connection.

On determining each new pattern, i.e., the original pattern modified by the substitution, the subject then tells the teacher, instructor or the like what that pattern or sequence means to him.

Quite advantageously, the matrix and system of the invention will not only find use in a manner of recreation, i.e., game playing, but can be used as well for diagnostic procedures and studies for psychological, psychoanalytical, and similar purposes.

A further advantage is the fact that the system can be used by individuals or groups. In either case, the system provides a basis for personalized stories. Each pattern situation developed is open ended so that many stories can be stimulated and developed about what has happened, what is happening, and what may happen.

Additionally, the systematic progression of exercises involved in the practice of the invention prepares participants for successful completion of succeeding steps.

In operation of the system according to the invention, a given image must be re-examined repeatedly in order to determine logics appropriate to its changing context. This results in an increased sensitivity to visual information, a greater appreciation and tolerance of alternative interpretations of reality, and a deeper understanding of fallibility in self and others.

Advantageously, the matrix of the invention reveals information to the subject about his internal reality, has capacity for creative thought, what he will or won't say in public, and his feelings. On the contrary, the prior art of which I am aware, can accomplish little in this highly subjective area.

When used by a group of people, the matrix provides a shared creative experience in which each participant discovers that his is not the only legitimate way of perceiving reality. There is little probability that, aside from the base group of visual representations, participants will "see" the groups in the same way, whereas with the prior art, there is a high probability of like interpretations of sequences.

In still a further embodiment of my invention, there is provided a game comprising a fixed matrix of a plurality of different discrete visual representations comprising a base group of visual representations and a plurality of additional groups of discrete visual representations presented in the format of a flip book, a means for selecting at random certain of the discrete visual representations about which a story is to be told, means for determining the type of story to be told, e.g., sad, happy, funny, scary, etc., and means for timing the telling of the story. Critically, as before in the case of the loose or non-fixed matrix, a base group of discrete representations is provided in which at least between next adjacent representations there is a logical connection and in the case of the discrete representations in the additional groups there is no logical connection except between next adjacent representations vertically from group-to-group.

BRIEF DESCRIPTION OF THE DRAWING

FIG. 1 is a symbolic representation of a matrix of discrete visual representations according to the invention;

FIG. 2 is a set of a plurality of cards each carrying a single visual representation which set of cards forms a matrix in accordance with the invention and can be used in its practice;

FIG. 3 is a representation similar to that shown by FIG. 1 illustrating a variation in the content of the matrix;

FIG. 9 is a schematic block diagram showing the system of the invention as an electronic or computerized video apparatus.

DETAILED DESCRIPTION OF THE INVENTION AND THE PREFERRED EMBODIMENTS THEREOF

Figure 4:
FIG. 4 shows the set of cards depicted in FIG. 2 arranged in a matrix of discrete visual representations in the manner disclosed in FIG. 1.

Turning now to the drawing, there is shown in FIG. 1 thereof, a matrix of a set of a plurality of discrete, different, visual representations used in the practice of one aspect of my invention. As set forth diagrammatically therein, and hereinafter more fully disclosed, the matrix shown in FIG. 1 defines the required relations of contents of one system according to the invention. However, the contents of the matrix, i.e., the discrete visual representations, can be of any various forms, e.g., a set of cards, on each of which is printed some visual or graphic representation of a person, place or thing, drawing, printed or painted thereon; a set of photographs or photoprints; individual discrete objects or members visually representing some person, place or thing, on the order of statuettes or minitures, e.g., like members of a chess set; or even as graphic symbols or images presented by electronic means.

As photographs the visual representations of the matrix will have an unusually advantageously more vivid and realistic character. Nevertheless, it will be appreciated, that the visual representations may be reproductions, by way of drawings or the like, and these may be presented in realistic fashion or as cartoon characterizations. Moreover, instead of an artifact representation, the visual representations may be the actual object or thing in a natural state or a model thereof.

In one system in accordance with the invention, as shown in FIG. 1, there is provided a plurality of discrete visual representations which, taken as an entire set, may be arranged in the matrix-like array shown, first in a base horizontal set or group A in the order of an obvious logical sequence of a plurality of visual representations or members, as indicated by the numerical sequence 1, 2, 3, etc., and then in a following plurality of successive additional horizontal groups, for example, as denoted by B, C, D, E, F and G. Each of the additional horizontal groups, as will be appreciated, comprises a plurality of discrete visual representations which, as in horizontal group A, are arrangeable in a logical sequence. Thus, as seen from FIG. 1 of the drawing, there are provided in the matrix not only a plurality of horizontal groups, but vertical groups as well, i.e., Columns I–VI, headed by the respective base group visual representations or members.

Although in the additional horizontal groups there is, as is shown in FIG. 1, a logical sequence between discrete visual representations or members in each horizontal group, i.e., an intra-group logic; most importantly, and this is a critical feature of the invention, there is also a logical connection or sequence, i.e., an inter-group logic between the members in each distinct vertical group. However, this logic need not be as is shown in FIG. 1, i.e., that there is a common connection between each discrete visual vertical representation. It is only necessary that there be a somewhat clear logical connection between each two successive vertical members. As a matter of fact, even with base horizontal group A, the logic can, if desired, be only between each two successive members of the group from left-to-right. Moreover, there need be no intra-group logic at all, as shown in FIG. 1, between members of the succeeding horizontal groups, e.g., as represented by B–G.

As shown in FIG. 1, this particular matrix set has seven horizontal groups of equal length sequence (i.e., an equal number of discrete different visual representations or members with corresponding vertical placement is provided) designated as horizontal groups A–G and six equal length vertical groups sequences designated by Roman Numerals I to VI. However, the matrix can be of any dimension desired, i.e., it can comprise a larger or smaller number of horizontal and vertical groups as desired, depending somewhat on the application intended for the system of the invention. The number of horizontal and vertical columns shown in FIG. 1, however, will provide satisfactory results in the practice of the invention. As will be appreciated, the underlined Arabic numerals, as shown in FIG. 1, each corresponds to, and designates, a different discrete visual representation.

In some cases in the practice of the invention, it may be desirable to be able to identify the particular location of any specific discrete visual representation in the matrix-like array shown in FIG. 1. Thus, a members ordinal position shown in a horizontal or vertical group (or row or column, respectively) can be set forth, for example, as AI, AII, AIII, etc., and IA, IB, etc., respectively. Obviously the horizontal and vertical rows can be identified by other means if desired, e.g., H1, H2, H3, etc., and VI, V2, V3, etc. or the vertical rows can be identified by alphabetical designation and the horizontal rows by Arabic numbers. The use of Arabic numerals within the matrix of FIG. 1 is merely to show, in the case of the horizontal rows, a logical progression or connection between the members, not necessarily to indicate their ordinal position in the matrix.

The discrete visual representations (e.g., photographs, drawings, or the reproductions of these, and/or actual objects, or electronic displays or these) or at least a majority thereof, are preferably representations of actual persons, places, animals, or things. For convenience of description hereinafter, the visual representations are assumed herein to be photographs. Accordingly, the system shown in FIG. 1 may be here called at times a "photographic matrix" or "a matrix-like set of photographs". Thus, in FIG. 2, there is shown a deck or set of card-like elements 9, of like-size, such as photoprints or imprinted cards, each bearing its respective representation as at the area designated "R". One or more objects Bj may also belong to the set, if desired.

In the photographic matrix, or set, of the invention, ideally not on the image field to avoid likelihood of biasing subject elections, the photographic representations will preferably each have some specific identifier whereby the person supervising the use, or to a person playing the game according to a further aspect of the invention, each discrete representation is readily identified for desired collocation in respective groups, e.g., as earlier disclosed by ordinal designation, e.g., AI, or by respective numerals, colors, forms, letters or symbols known only to the supervisor or the like. Obviously these identifying designations need not necessarily be placed on the representations themselves. Instead, the key can be provided on a separate card or the like accompanying the set.

The photographic representations in base horizontal group A are such that they can be arranged logically with little difficulty in say a linear horizontal spatial array as a first visible pattern AI, AII, AIII, etc. Also, the photographic representations in each succeeding horizontal group sequence in the matrix of FIG. 1 can be arranged logically with little difficulty; however, they are not intended to be so arranged, i.e., in a matrix, in ordinary use, Moreover, as earlier disclosed, the logic in the base horizontal group A need only exist between two adjacent members, e.g., between members AI, AII; AIII, etc. Likewise, there need be no logical connection between members in horizontal groups B–G. The critical aspect of a system according to the invention in respect to the system shown in FIG. 1 is that there be a logical connection between next adjacent members in the vertical rows, e.g., IA, IB; IB, IC; etc., and VA, VB, etc.

Although each vertical group sequence as before disclosed has its own logic, the type of vertical logical connection, to corresponding members in a preceding horizontal group, need not be identical across a given horizontal group. Furthermore, the logic of each vertical sequence not only need not be the same as that of other vertical sequences or other first (or base) horizontal group "A", but the logic within a given vertical sequence may change; e.g., in vertical sequence II the logical connection between AII and BII may be chronological or temporal; between BII and CII may be visual, by say similarity of subject with a color difference predominant; between CII and DII, verbal say with identity of primary subject matter, but a difference such that a narrative designation of the difference would be required.

The uniformity of the six-by-seven matrix of FIG. 1 though preferred in certain instances, is not necessary in the practice of the invention; neither must a set or matrix be of any particular dimension, as before-disclosed. The contents of the set and lengths of the sequences depend entirely on the purpose of the particular set. As indicated in FIG. 3, without members being located at ordinals CI, DIV, DVI and GII and with member EVII being alone and not in a vertical column, no one horizontal group need be the end of any or of all vertical groups; and no one vertical group need be the beginning or the end of any or all horizontal groups. Indeed, group A may for some purposes even include extraneous members, as indicated by (8) in basic horizontal group A, to which no other member is related to constitute even a two-member connection vertical group. Where the matrix, however, has extraneous members such as (8) in the base group, such a member will, of course, be deemed next adjacent to the last member in that group, e.g., the representation denoted by, in this case, 6. In a similar manner where there are gaps in the matrix as in CI in FIG. 3, member DI will be considered next adjacent to BI.

DESCRIPTION OF MEMBER CONTENT OF AN EXEMPLARY SET

The composition of one particular set of a photographic matrix in accordance with the invention useful for educational purposes is disclosed in FIG. 4 of the drawing. The discrete visual representations as shown therein are identified below by the ordinal number, followed by a brief description of each individual photograph.

| Member | Horizontal Sequences Descriptions |
|---|---|
| (Group A) | |
| AI: | A BOWL OF FRUIT |
| AII: | A HAND TAKING A BANANA OUT OF THE BOWL OF FRUIT |
| AIII: | THE BANANA BEING PEELED |
| AIV: | A FEMALE EATING THE BANANA |
| AV: | A MALE HOLDING A BANANA (Less Banana present than in AIV) |
| AVI: | A BANANA PEEL ON A PLATE NEXT TO A BOWL OF FRUIT |

The logic (intra-group logic) in horizontal group A is the successive connection between the discrete visual representations from left-to-right through the banana, progressively for the "fate" of the banana.

| Member | Horizontal Sequences Descriptions |
|---|---|
| (Group B) | |
| BI: | A BOWL OF FRUIT IN FRONT OF A TELEVISION SET |
| BII: | A HAND TAKING AN ORANGE FROM A BOWL OF FRUIT |
| BIII: | A HAND UNZIPPING A JACKET |
| BIV: | A COUPLE EATING WATERMELON, FEMALE PREDOMINANT |
| BV: | A MALE HOLDING A QUARTER |
| BVI: | TWO HAMBURGERS ON A PLATE SET ON A TABLE |
| (Group C) | |
| CI: | A TELEVISION SET DISPLAYING AN EYE ON THE SCREEN |
| CII: | A HAND HOLDING A TENNIS BALL IN FRONT OF A DOG |
| CIII: | A HAND DEPRESSING THE LATCH ON A DOOR HANDLE |
| CIV: | A COUPLE SMILING |
| CV: | A HAND PUTTING A QUARTER INTO A COIN SLOT OF A MACHINE |
| CVI: | A MAN WIPING HIS MOUTH AT A TABLE |
| (Group D) | |
| DI: | A PAIR OF EYEGLASSES |
| DII: | A DOG JUMPING TOWARDS A WOMAN STANDING IN THE WATER |
| DIII: | A HAND DEPRESSING A FLAT BICYCLE TIRE |
| DIV: | A COUPLE HOLDING A BLACK CAT |
| DV: | A WOMAN SITTING IN A PHOTO BOOTH |
| DVI: | A CLOSE-UP OF TEETH BEING BRUSHED |
| (Group E) | |
| EI: | A PAIR OF CHAMPAGNE GLASSES BEING FILLED WITH CHAMPAGNE |
| EII: | A FRAMED PHOTOGRAPH HANGING ON THE WALL SHOWING THE SCENE OF D2 |
| EIII: | THE HANDLEBARS OF A BICYCLE |
| EIV: | A BLACK CAT |
| EV: | THREE PHOTOGRAPHS |
| EVI: | A WOMAN WASHING HER HAIR IN A SHOWER |
| (Group F) | |
| FI: | A WOMAN HOLDING A CHAMPAGNE GLASS AT A CELEBRATION |
| FII: | A FRAMED PAINTING OF A SEATED WOMAN |
| FIII: | THE STEERING WHEEL OF AN AUTOMOBILE |
| FIV: | A HORSE |
| FV: | THREE BOW TIES |
| FVI: | A CHILD WADING IN THE SURF AND HOLDING A LOLLIPOP |
| (Group G) | |
| GI: | A WOMAN AT A TABLE |
| GII: | AN EMPTY CANVAS RESTING ON AN EASEL |
| GIII: | AN AIRPLANE |
| GIV: | A HORSE LYING DOWN |
| GV: | SCULPTURE OF A CHARACTER WEARING A BOW TIE |
| GVI: | A CHILD WITH HAND IN FRONT OF FACE AND HOLDING A TOY GUN, SAME CHILD AS IN F6 |

As can be seen in reference to horizontal groups B–G, in contrast to Group A there is no logical connection (intra-group logic) between all the members in each horizontal group, not even between every next adjacent member.

| Member | Vertical Group Sequences Description |
|---|---|
| (Group I) | |
| IA: | A BOWL OF FRUIT |
| IB: | A BOWL OF FRUIT IN FRONT OF A TELEVISION SET |

-continued

Vertical Group Sequences

| Member | Description |
|---|---|
| IC: | A TELEVISION SET WITH AN "EYE" ON THE SCREEN |
| ID: | A PAIR OF EYEGLASSES |
| IE: | A PAIR OF CHAMPAGNE GLASSES BEING FILLED WITH CHAMPAGNE |
| IF: | A WOMAN HOLDING A CHAMPAGNE GLASS AT A CELEBRATION |
| IG: | A WOMAN AT A TABLE |

Connections (Inter-group logic)) between next adjacent discrete visual representations

| | |
|---|---|
| A to B: | bowl of fruit |
| B to C: | television set |
| C to D: | objects related to seeing |
| D to E: | homonym (same word, different meaning) |
| E to F: | champagne glasses |
| F to G: | same party (background and costume similar) |

(Group II)

| | |
|---|---|
| IIA: | A HAND TAKING A BANANA OUT OF THE BOWL OF FRUIT |
| IIB: | A HAND TAKING AN ORANGE FROM A BOWL OF FRUIT |
| IIC: | A HAND HOLDING A TENNIS BALL IN FRONT OF A DOG |
| IID: | A DOG JUMPING TOWARDS A WOMAN IN THE WATER |
| IIE: | A FRAMED PHOTOGRAPH ON THE WALL OF A DOG JUMPING TOWARDS A WOMAN IN THE WATER |
| IIF: | A FRAMED PAINTING OF A SEATED WOMAN |
| IIG: | AN EMPTY CANVAS RESTING ON AN EASEL |

Connections (inter-group logic) between members:

| | |
|---|---|
| A to B: | a hand removing a piece of fruit from a bowl of fruit |
| B to C: | a hand holding a round object in same quadrant of representation |
| C to D: | dog |
| D to E: | the framed photograph of the preceding image D |
| E to F: | framed image |
| F to G: | painting |

(Group III)

| | |
|---|---|
| IIIA: | THE BANANA BEING PEELED |
| IIIB: | A HAND UNZIPPING A JACKET |
| IIIC: | A HAND DEPRESSING THE LATCH ON A DOOR HANDLE |
| IIID: | A HAND DEPRESSING A FLAT BICYCLE TIRE |
| IIIE: | THE HANDLEBARS OF A BICYCLE |
| IIIF: | THE STEERING WHEEL OF AN AUTOMOBILE |
| IIIG: | AN AIRPLANE |

Connections (inter-group logic) between next adjacent members:

| | |
|---|---|
| A to C: | hands opening things |
| C to D: | thumb pressing |
| D to E: | bicycle |
| E to F: | steering mechanism |
| F to G: | vehicle that increases mobility |

(Group IV)

| | |
|---|---|
| IVA: | A FEMALE EATING THE BANANA |
| IVB: | A COUPLE EATING WATERMELON, FEMALE PREDOMINANT |
| IVC: | A COUPLE SMILING |
| IVD: | A COUPLE HOLDING A BLACK CAT |
| IVE: | A BLACK CAT |
| IVF: | A HORSE |
| IVG: | A HORSE LYING DOWN |

Connections (inter-group logic) between members:

| | |
|---|---|
| A to B: | eating |
| B to C: | same couple |
| C to D: | couple |
| D to E: | cat |
| E to F: | animal |
| F to G: | horse |

(Group V)

| | |
|---|---|
| VA: | A MALE HOLDING A BANANA (less banana present than in A4) |
| VB: | A MALE HOLDING A QUARTER |
| VC: | A HAND PUTTING A QUARTER INTO THE COIN SLOT OF A MACHINE |
| VD: | A WOMAN SITTING IN A PHOTO BOOTH |
| VE: | THREE PHOTOGRAPHS |
| VF: | THREE BOW TIES |
| VG: | SCULPTURE OF A CHARACTER WEARING A BOW TIE |

Connections (inter-group logic) between members:

| | |
|---|---|
| A to B: | action (holding) and composition similar |
| B to C: | quarter |
| C to D: | coin operated machine |
| D to E: | example of product generated by machine in D |

| | -continued |
|---|---|
| | Vertical Group Sequences |
| Member | Description |
| E to F: | three objects |
| F to G: | bow tie |
| (Group VI) | |
| VIA: | A BANANA PEEL ON A PLATE NEXT TO A BOWL OF FRUIT |
| VIB: | TWO HAMBURGERS ON A PLATE SET ON A TABLE |
| VIC: | A MAN WIPING HIS MOUTH AT A TABLE |
| VID: | A CLOSE-UP OF TEETH BEING BRUSHED |
| VIE: | A WOMAN WASHING HER HAIR IN A SHOWER |
| VIF: | A CHILD WADING IN THE SURF AND HOLDING A LOLLIPOP |
| VIG: | A CHILD WITH HAND IN FRONT OF FACE AND HOLDING A TOY GUN |
| Connections (inter-group logic) between members: | |
| A to B: | plate of food |
| B to C: | temporal - meal served/meal completed |
| C to D: | temporal - meal completed/cleaning teeth |
| D to E: | cleaning |
| E to F: | getting wet |
| F to G: | same child, also holding object |

SYSTEM USE AND OPERATION

The photographic matrix set such as that previously detailed in the description of FIG. 4 is now described for use in increasing conceptual flexibility in an educational setting.

The student (at a large desk or other work surface) is told that he will be presented with a group of different photographs, and will be requested to arrange these photographs in a linear spatial array in any order that he desires, that there is neither a right nor a wrong way (i.e., pattern) to organize the photographs; and that he need not use all of the photographs given to him.

The base horizontal group A photographs are taken from the matrix set and first scrambled or shuffled so that they do not follow the assumed logic; this group of photographs is then given to the student, thus in random "order". The student is then requested to arrange the photographs or visual representations in a first pattern. Each of the subsequent horizontal groups taken from the matrix set, i.e., B, C, etc., of photographs similarly is separately scrambled before presentation to the student.

After the student has ordered base group A, he is then requested to describe verbally, either orally or in writing, what the sequence is about, e.g., tell a story about what he perceives. If the student has not produced a logical sequence, he is simply asked questions about the photographs and the arrangement made, e.g., what the photographs and pattern mean to him.

Next, the already shuffled horizontal group B of photographic representations is presented to the student. He is then asked to substitute through matching or pairing, on a one-to-one basis, photographs from this new group, i.e., group B, with those of the prevealing pattern of photographs which he derived from group A. If desired, the student can first lay out the group B photographs in a horizontal row and arrange them in a pattern suitable to himself. Then the pattern can be re-arranged, if desired, and the "vertical" substitutions made. The student should be assured that whatever matching or pairings he makes, they are not incorrect.

As each member of horizontal group B will have a close logical correlation with some corresponding element in a member in group A, substitutions will generally be made. However, if a student does not put a photograph where the teacher or supervisor believes he should, ordinarily the student is not to be "corrected", for he may have a different association, or have perceived a logic different from that obvious to the teacher supervising the use.

When the student has completed his effort, as requested at using the members of group B, so also after each subsequent group presented, any photographs removed from the pattern because of substitution, or those from a currently presented additional group unused for substitutions, should normally be removed from further viewing. Thus, only the currently derived array or pattern of photographs is present at the time when his description or story is requested, and thereafter, when he is presented with an additional group for substitution purposes.

On deriving the second pattern or sequence, the student is then again asked to describe verbally his derived sequence or pattern. After this, he is given the photographic representations, already shuffled, of horizontal group C, and substitution is again requested; and so on, until the photographic members of the horizontal group G or the final group of visual representations from the matrix has been similarly dealt with.

In using an additional group of photographic representations, the student may be instructed that he need not keep the photographs of his prevailing derived pattern or sequence in the same order; rather, the photographic representations may be rearranged, if he so elects, particularly if such a rearrangement seems advantageous to the instructor or teacher.

The logical connections provided throughout the matrix in the vertical columns advantageously carry the subject back repeatedly into each prevailing derived pattern depending upon substitutions or additions made, at one or more points requiring him then to deal with at least one but usually a plurality of previously encountered member images in different ways, associatively and imaginatively, and generally by more intent inspection of sensible visible content; in decided contrast to any sequence card sets known heretofore. A given image must be re-examined several times in the course of matrix operation in order to establish logics appropriate to its changing context.

Usefully, as is more easily done with photographs or cards bearing the individual visual representations, the entire matrix set may also be presented for selective arrangement of some elected part or all of the set by the subject. All the matrix set may be presented to the subject in successive groups with each successive group being arranged in a pattern intrinsic to itself, and also having a logical relation to the members of the precedingly arranged group in a large pattern being constructed from the entire set.

In a somewhat different procedure according to the invention, all of photographs in the photo matrix, having been shuffled together, can be presented to the subject face down, with the request to randomly select as many photographs as he pleases, then to turn those photographic representations selected face up. After the members selected are then turned face up, the student is requested to arrange them in a pattern, and to describe the pattern sequence, as previously done. This can be repeated, as before, until all of the cards of visual representations or members of the matrix have been used. Depending on the photo matrix used and its purpose, requirements may be established which specify the number of photographs that a group must contain at a given point.

A further alternative manner of using the system of the invention is to arrange the visual representations in stacks of cards, where each stack comprises a given vertical column of the matrix. The student will then select at random a single visual representation from each stack, arrange those representations into a desired pattern, and then tell the story of what that pattern means to him.

This system, in its simplest form requiring merely an appropriate set of still photographs or reproductions, may be used to identify creative individuals; to increase ability to think creatively; to improve verbal skills and visual literacy; to provide information potentially helpful to a teacher in better understanding his students; or to aid diagnosticly with or to help cure the mentally ill. Specific sets may be composed better to meet the particular demands of each of these types of functions.

One view finds a basis for the effectiveness of the system, on the hypothesis that the brain's structure and function is such that it is possible to associate, either consciously or unconsciously, any and all symbols contained in memory; and that the photographs of the set are or become in a sense simply points in a mental, that is, associative memory continuum; and thus can ultimately suggest anything and everything of that continuum. Thus, the association interval between the photographs becomes important through the operation of the associative faculty of the subject in building and filling in a connection between these points.

In evoking this operation, the system of the invention is especially useful toward developing free expressions of the connections associatively bridging that gap or interval. This enables the subject not just to understand, but to experience the enormous creative potential with which he is always endowed and to exercise his associative capabilities.

The primary focus of the system according to the invention is on the development of a conceptual flexibility that has practical application as a personal strategy for apprehending the world and exploring one's ideas about it. It does so through the exercise of bisociative thinking, a skill which involves the connecting of symbols across conceptual boundaries. Acquisition of this skill provides a learner with the capacity to approach old problems, objects and events with more mobile and expanded frames of reference and, by so doing, creates a greater opportunity for discovery.

Such a matrix as set forth in this invention can be advantageously used simply by subject manipulation of the visual representations for the establishment of visual patterns, without even subject verbalization, both in the viewpoint of subject development of imagination and associative powers, through reading connective associations into or between the members with concomittant visual literacy growth; and also objectively for example, for various psychological or psychoanalytical purposes, from the viewpoint of the observer of the behavior induced in the subject, or the patterns produced from or his non-responses to members of the set.

Further where verbalization, oral or written by the individual subject, is sought and evoked, there is a further development of associative power, in strengthening associations, in terms of picture-to-word relation by the acts of verbalization; a development of verbal ability in more ready expression by the practice of describing the synthetic situations of the patterns produced especially with the representations taken from reality with growth in the subject by his experiences; and again the possibility of useful information being offered to or derived by an observer respecting educational, psychological, emotional, or other problems.

To the extent that the very experiences of manipulating the groups, or manipulating and the verbalizing respecting derived patterns may be raising what may be termed unconscious associations to an external and in a sense objectivized level, there may be a release of tensions and certain conflicts represented by or embodied in the associations, even though the conflict not be recognized as such by the subject; and where this occurs, there is a positive therapeutic value in the use of the system.

The visual content, size and character of logical connections of the members of the set will of course be dictated by the ends to be achieved, whether as a game for playing, whether educational, diagnostic or therapeutic for educational, psychological or psychoanalytical purposes, and also the manner of use by the subject, and the direction or influence by the one guiding the use.

Also either a particular set or the object of the session may be such that the procedure may specify that the student be encouraged toward or discouraged from making certain orderings or substitutions. It may be specified that under certain circumstances certain reorderings, subsitutions, inclusions, or verbal explanations by the subject should receive a positive, a neutral, a negative, suggestive or interpretive response from the instructor, supervisor or teacher; and it may be specified what form this response should take (e.g., physical, verbal, gestural, etc.). Expression by the student in other than verbal modes may also be encouraged, e.g., drawing, dance, performance, or music.

By the end of a session utilizing the system of the invention, the student has experienced bisociative thinking, transforming, gradually and systematically, through his own logic, a simple sequence into one that just a short time before would have seemed absurd. He has preceived new relationships and created stories; he has verbalized or otherwise expressed himself. In doing this, he has been exposed to and has had to operate upon visual materials extensively.

A great advantage of this system, however, is not simply in its power to develop the student's verbal and visual skills; it is the generation of the freedom and confidence to deal creatively with problems posed by many disciplines.

Moreover, because of the experience gained in working through a set in the described "normal" mode of presentation, some students, presented with the matrix set rotated by 180°, i.e., in reverse order, e.g., group G, F, etc., may readily produce a pattern sequence from group G as the first group, giving a reasonable accounting for or a story derived in that pattern, despite the fact that the group G as such was not composed by the set author with any obvious logical connection between its members.

After a student becomes familiar with the system procedure, he can work independently, and ultimately even can make his own photographic matrix set. These sets, as can the one above-described, can be used with individuals or with groups.

When the system is used for psychological or analytical purposes of diagnosis or therapeutics, the symbolic nature of the arrangement of the images and the storey told by the patient is made less evident to the patient by the simplicity and enjoyable nature of working a matrix set of photographs. The system provides "points" (photographs, objects, representations, etc.) which are connected through unconscious pathways and by speaking of their connections, the "spaces", the gaps or intervals between them, the unconscious is revealed. The patient through his own logic having created the group patterns, is more apt to believe that they possess some logic; and therefore speak more freely about what he has composed visually. Believing he was doing nothing but making up stories, the patients defenses are down; and his unconscious will be more accessible. The only restriction placed on the patient is what is inherent in the photographs themselves, inasmuch as they determine what the "points" are. Even there, however, variability in image interpretation is great. Thus, the system is relatively more efficient than conventional analytical techniques, in that the subject or patient may speak more freely than when conventional methods are used.

Use of several different matrix sets can generate monologues which will usually expose patterns or themes in the unconscious thereby confirming what a "test-like" set may reveal. One or more aforementioned extraneous members as shown in FIG. 3 often may especially advantageously be included in group A for diagnostic purposes, as well as in some sets with a purely educational objective.

Although the invention has been described more particularly by reference to a photographic matrix, it will be appreciated that the representations, as earlier disclosed, may take many forms. However, in whatsoever way the visual representations are presented, they must be offered in a format which in general at least allows the presentation of the members of a first or base group, preferably in a random order; then, by the subject an establishment of an elected visible pattern or sequence of the presented discrete visual representations; and also, in that established pattern, or in a pattern subsequently established, the introduction by substitution of visual representations from presented additional groups, thereby to modify the previously established pattern and to establish new patterns. Preferably, the visual representations or members of the patterns may be simply subtracted and added to, matched or paired with, as well as substituted by members of a presented additional group, to introduce new members with any appropriate rearrangement as desired for each pattern.

Although in reference to the matrix set disclosed in FIGS. 1 and 4, base group A is described as a horizontal base group, it will be appreciated that the base group of discrete representations may be presented either horizontally or vertically. Where the base group of the matrix is presented vertically, the additional groups of pluralities of visual representations will also be presented as vertical groups. Thus, in this context, the next adjacent vertical representations in the base group must have a logical connection between them. And, with respect to the additional vertical groups, the logical connection will be between next adjacent members horizontally, i.e., an inter-group logic rather than between members vertically.

GAMES INVOLVING FIXED MATRIX

Figure 5:
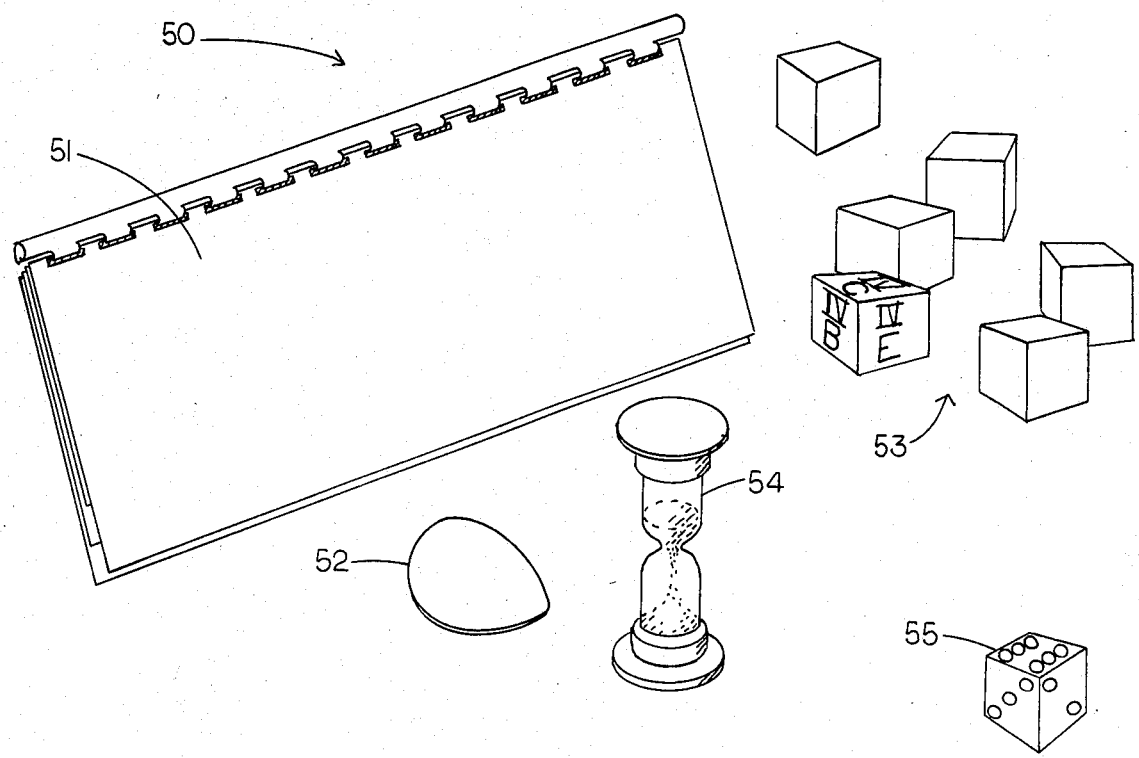
FIG. 5 shows a fixed matrix of discrete visual representations according to a further aspect of the invention and in association therewith are other game components used in the practice of this aspect of the invention, such as dice and a timer.

In a still further, and somewhat different aspect of the invention, there is provided, as shown in FIG. 5, one example of a game 50 in accordance with the invention, comprising a fixed matrix 51 of a plurality of discrete visual representations, a pick 52, a set of special dice shown generally by reference numeral 53, a timer 54, and at least one ordinary die 55.

Figure 6:
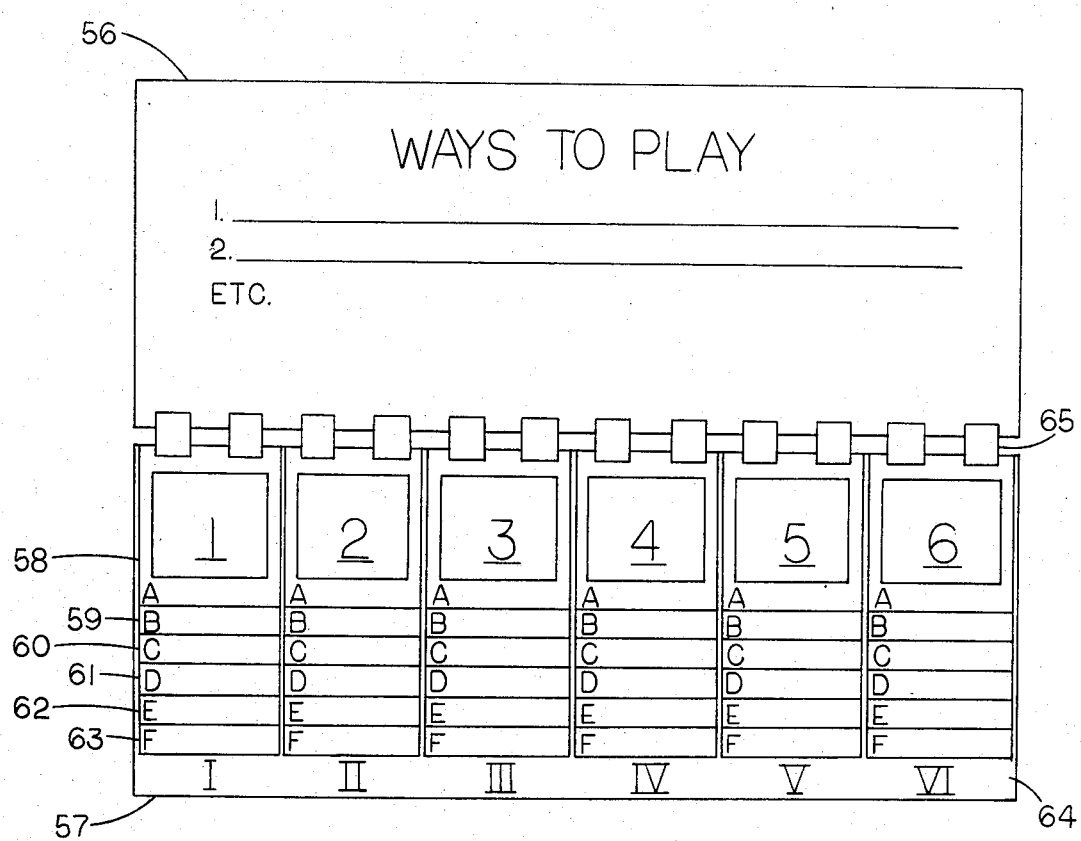
FIG. 6 shows the fixed matrix of FIG. 5 with the cover opened in anticipation of playing the game according to the invention, and showing the matrix-like array in flip book format of horizontal and vertical rows of discrete visual representations.

Fixed matrix 51, as is best shown by reference to FIG. 6 is in the format of a book which comprises front and back covers 56, 57 and a plurality of pages 58–63, each of which corresponds to the horizontal groups A–F of discrete visual representations shown in the matrix of FIG. 4.

As is shown by FIG. 6 of the drawing, each horizontal group, or page of the book, is divided into six discrete components on the front side of each of which is carried, e.g., imprinted, a visual representation identified, as in FIG. 1 for sake of convenience, by arabic numerals 1, 2, 3, etc. Thus, the discrete visual representations or members of horizontal base group (or row) A of fixed matrix 51 will, as in the previously described matrix, form the base members of vertical columns or groups of visual representations identified by Roman Numerals I, II, III, etc., as imprinted on the longitudinal inside edge 64 of back cover 57. It will be appreciated, however, that the dimensions of fixed matrix 51 can be larger or smaller, as desired.

The discrete components carrying the visual representations or member of the matrix in each of the horizontal groups or rows, as shown in the drawing, are seen to be of a rectangular configuration; however, they need not necessarily be so designed. The main requirement is that each discrete member be of such a shape as to permit ready flipping of the members located below another in any particular horizontal group, to reveal a desired member vertically. The discrete members can, if desired, be square or even of irregular shape. From a left-to-right direction, the members can even be of a different widths. Nevertheless, it is necessary that between next adjacent vertical columns there be no overlap between any of the members. Preferably all members in any vertical column will be of the same width, i.e., co-extensive laterally.

In the drawing, referring to FIG. 6, it is seen, however, that while the members in each succeeding horizontal group, i.e., top-to-bottom, are co-extensive laterally, i.e., left-to-right, these superposed members are not co-extensive longitudinally. Thus, member BI, while of the same width as member AI, is of somewhat greater length than member AI. Accordingly, each preceding upper member beginning with the base group, or a blank component hereinafter described, partially overlaps a succeeding lower member in the fixed matrix, so as not only to cover up the visual representation on the next lower member but also to provide, a tail or edge for imprinting, as shown in the drawing, of a means of identification or coding, as desired, on each matrix member, the purpose for which will later be described, if not already obvious. Thus, the visual representations or members in the fixed matrix shown are identified or coded by their respective group A, B, C, etc., the vertical columns or groups being designated as indicated by the imprinting of the Roman Numerals on the exposed inner edge 64 of back cover 57. Thus, as in the matrix of FIG. 4, the visual representations or members of the matrix can be identified by their ordinal position, e.g., AI, AIII, CII, etc. in the matrix.

In certain instances, and in the preferred embodiment of the invention, a page of blank components is provided to precede the first page or base group of representations of the fixed matrix. Thus, in the matrix shown in FIG. 6 of the drawing a page divided into six components laterally coextensive with the components of Page 58 would be the first page of the book. These components would not, however, be longitudinally coextensive with the components of Page 58, leaving an edge for placement of the means of identification of the representations of base group A. Thus, the blank components will, as hereinafter made clear, provide means for eliminating representations not chosen during playing of the game from the visual field.

As the purpose of dice 53 are to determine at random a selection of discrete representations in fixed matrix 51, about which a story is to be told, it will be appreciated that these dice must be coded in appropriate fashion, relative to the discrete representations of the matrix. This, however, will depend somewhat on the dimensions of the matrix. In this particular case, as the matrix dimension is 6×6, dice set 53 will comprise six dice, representing the six vertical columns of the matrix. Each of the dice, as shown in the drawing, has six sides, corresponding to the six horizontal groups of representations, each side of which is inscribed or otherwise designated with the ordinal position of a single member of the matrix, e.g., the side of one die will be inscribed IA, IB, IC, etc.; and the sides or faces of die number two will be inscribed, respectively, IIA, IIB, etc. Although only one of the die in the drawing is shown inscribed, it will be appreciated that all are appropriately marked.

It will be readily appreciated, however, that various other identifying means or codes can be used for the discrete members of the fixed matrix in the practice of the invention. This will depend somewhat, as before mentioned, on the dimensions of the matrix, i.e., the number of horizontal and vertical groups involved. Thus, where the matrix dimension is 6×6, the discrete visual members can be colored coded, e.g., those in the base and succeeding horizontal groups and in any vertical row or group identified by dots of various colors, e.g., orange, red, green, and the vertical groups identified by arabic numerals. In this case, the dice set can be of six sided dice, each die being imprinted on its respective side with the dot of corresponding colors to the discrete visual members, the vertical group Arabic Numeral being printed in superposed relation in each colored dot. Thus, the sides of a die would be imprinted with an orange dot on which was imprinted the number 1, a red dot on which was imprinted the number 1, etc. Second die would be imprinted with an orange dot imprinted with the number 2, a red dot imprinted the number 2, etc.

In still another manner of identification, where the dimension of the fixed matrix is 6×6, the vertical members could all be identified by the same color but by a different number of colored dots. Thus, instead of base member AI in fixed matrix 51 being identified as "A" this member could be identified by having applied to its bottom edge a single red dot of suitable dimension. Member BI would be identified by two red dots, CI by three red dots, etc. Thus, with such a manner of identification, the disce set 53 could be six conventional six sided die, each of a different color corresponding to the colored dots provided on the discrete members of the various vertical groups in the matrix.

Still, in a further embodiment in the practice of the invention, selection means other than dice 53 can be used. Thus, the dial or needle type selector commonly used in games can be used if desired. In this case, the needle board can be imprinted with an appropriate circle or the like divided up into colored sections, each section being imprinted with the appropriate ordinal designations, or colors and numbers could be used, depending on what particular identification means is used for the discrete representations of the matrix. However, the use of dice as the selection means is preferred, as it facilitates playing of the game in that a number of selections can be made with one roll of the dice.

Figure 7:
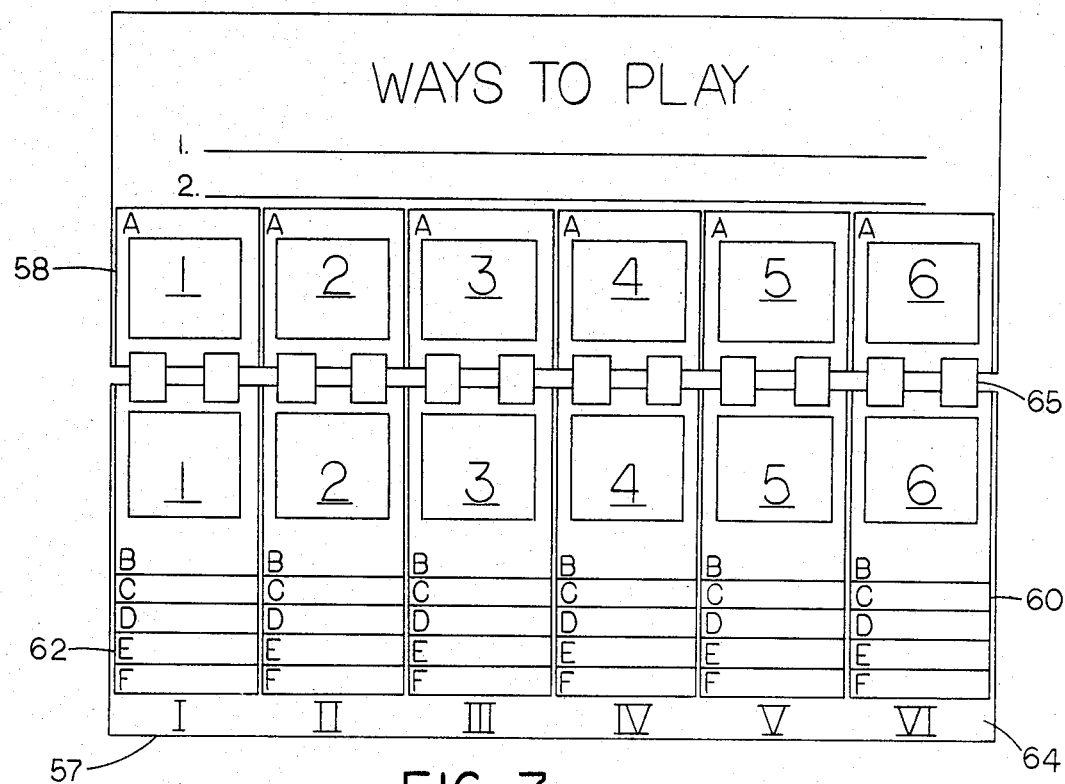
FIG. 7 shows the fixed matrix of the game invention with the second (first additional) horizontal group of discrete visual representations exposed.

As shown in FIG. 7, the reverse or back side of the components of divided page 58, etc., can carry a visual representation thereon, if desired. Thus, the same visual representation shown on the front side of the component can be carried on the reverse side, or the exposed representation can be carried on the reverse side of the preceeding component with the representation arranged so that players facing one another can both see the particular visual representations or graphics involved in the telling of the story. See FIG. 8.

Although timer 54 used in the practice of the invention is a so-called "hour glass" it can be of any various conventional timing means used in playing games, e.g., a simple clock mechanism or mechanical timer, or even a stop watch. The time sequence which such a timer determines will depend somewhat on the particular application involved for the system or game. However, for example, when the system of the invention is used as a party game the time determined should ordinarily be no more than a few minutes, e.g., only about three minutes to tell a story, to keep the game moving and of continuing interest.

Although fixed matrix 51, so-called because ring binder 65 maintains horizontal group A (first page) in a fixed relationship to the other horizontal groups (succeeding pages), is disclosed as a book, it need not necessarily be of this particular format. Neither must the matrix of the game be fixed. In some cases it may be desirable that the ring binder be of such configuration that the discrete visual representations in any horizontal row can be rearranged, or that the horizontal rows be changed in their particular location, etc. Where the matrix used in the practice of the game invention is a photo matrix such as disclosed in FIG. 4, and the discrete visual representations are like-size cards, it may be desirable to have the matrix located in a tray of suitable configuration. Thus, the matrix cards could be presented in horizontal groups, the cards individually being located in slots or indentations provided in the tray. Such a tray can readily be formed by various conventional plastic molding techniques, e.g., vacumm forming.

In the use of a matrix in accordance with the invention, and the presentation of that matrix in a vacuum-formed plastic tray, the practice of the invention can begin with all of the like-size cards arranged in matrix format in the tray, as in the fixed matrix or book format. Thus, the players of the game as herein described can, on selecting the representations about which a story is to be told, remove those graphics from the tray, displaying them for the other players to observe during the telling of the story. When the story is finished and scored, the visual representations will then be replaced in the tray in their appropriate location. In another fashion, however, the vacuum-formed tray can be used only to hold the visual representations of the horizontal base group A, and those of any succeeding pattern derived by the player or student. Thus, the player or student is presented with the horizontal base group A representations, these are arranged by the student in a pattern in the vacuum-formed tray, and the student then tells a story about the pattern derived. The next group of visual representations are presented to the student and he arranges them in a pattern in the tray adjacent to the first pattern derived. The student then makes the substitutions as before described from the second group of visual representations into the previously formed pattern. Those representations removed from the first formed pattern and those not used in the substitution from the second presented group are then removed from the tray and the student is presented with the third group of visual representations. A pattern is arranged as before, substitutions are made, and the cards removed from the tray. The play continues until all of the visual representations from the matrix have been used and a single derived pattern remains.

The object of the game is to tell a story, within the time limits set, using all of the graphics or discrete visual representations selected, as hereinafter more fully described. While any number of players can obviously play the game of the invention, it will be found most enjoyable and entertaining in a group of at least several players, e.g., as a party game. When used in such a group, a matrix according to the invention provides not only entertainment but a shared creative experience in which participants discover that theirs is not the only way of perceiving "reality". As the matrix can be provided with various content, the game can be employed to advantage by people of all ages and in many different contexts.

In playing the game, as set forth in FIG. 5, the first player is choosen by each player, preferably in turn, rolling the conventional die 55, or each player can be provided with such a die and these are rolled simultaneously. In this case it may be desirable to have a different colored die for each player. The player with the greatest number of dots on the top face of his die will then go first, i.e., be the first story teller. The player with the least number of dots on the top face of his die will roll againt to determine, as hereinafter more fully discussed, the type of story the first player must tell. Thereafter, the player, on finishing his story, will roll the die to determine the type of story the next player must tell.

Provided with the game is a listing of various types of stores that can be told, e.g., sad, happy, funny, scary, science-fiction, angry, astounding, amazing, love, surreal, free choice, etc. Obviously many other types of stories can be included on the list. However, for sake of convenience in description of the invention, the list can be kept to only six different types of stories, corresponding to the six dots on a conventional die. In this case, a number one thrown by the die may correspond to a sad story; two corresponds to a happy story, three to a funny story, etc. Or the game can be devised so that two rolls of the die is required, the first to determine the beginning mode of the story and the second roll to determine the conclusive mood of the story. Thus, a story may go from one that is sad to one that is happy. Obviously other selection means than the single die can be used, depending somewhat upon the number of different stories provided in the listing of the game. The selection means could involve a needle pointer having a circle divided into a number of segments according to the number of different types of stories listed. Actually there need be no separate and distinct selection means as represented by die 55 provided at all with the game. Where the matrix is dimensioned 6×6 and conventional, different colored dice 53, as previously disclosed, are used in the practice of the game; these dice can be used to serve several purposes. They can be used first to determine the first player to tell a story, after which they can be used to determine the nature of the story to be told. Thus, on the first roll of the dice, the player rolling the highest number as before disclosed will go first. The player rolling the lowest number will select the nature of the story to be told. That player may, as before disclosed, roll twice, first to determine the beginning mood of the story and secondly the conclusive mood, depending on which rules of play the players adopt.

Once it is determined which player will go first, and what type of story is to be told, that player will then indicate the vertical columns in the fixed matrix from which he will select visual representations to tell his story. In the case of the fixed matrix shown in FIG. 5, a maximum of six representations can be chosen, one for each vertical column. And, in this particular case, a minimun of three is required to be chosen. The minimum will, of course, depend somewhat upon the dimensions of the matrix. Nevethelss, three representations are most desired, as a minimum, to weave the story.

The player telling the story then rolls the dice corresponding to his selected columns, to determine the pattern of visual representations about which his story will be told. Thus, if the player has selected vertical columns identified by Roman Numerals II, IV and V, he will then choose the particular dice for those vertical columns and roll the dice. As usual, the visual representations as indicated by the coding on the top surface of the die are those forming the pattern about which the story is to be told. It will be appreciated, that in this situation, the pattern is determined totally at random; therefore, any logic between the visual representations is mostly imposed by the story teller or player.

Once the ordinals of the visual representations are determined, the player then turns to the particular graphics indicated by his role of the dice and, based on these, he attempts to tell a story of the required kind within the time limit. The flipping of the visual representations in the fixed matrix, to reveal those corresponding to the rolled dice can, most advantageously, be accomplished by pick 52. This can be merely a conventional guitar pick or the like which makes it possible to more readily flip the visual representations than by using one's fingers. Moreover, the use of the pick rather than one's fingers will prevent soiling and damage to the visual representations.

When the visual representations or graphics about which a story is to be told are revealed in the fixed matrix, the player telling the story may then first be required to give the story a title; or the title can be, instead, required to be given after the story has been told, if desired. At the same time, or earlier if desired, i.e., when the dice are rolled to determine the pattern of visual representations, the player determining the type of the story will also start the timer.

Figure 8:
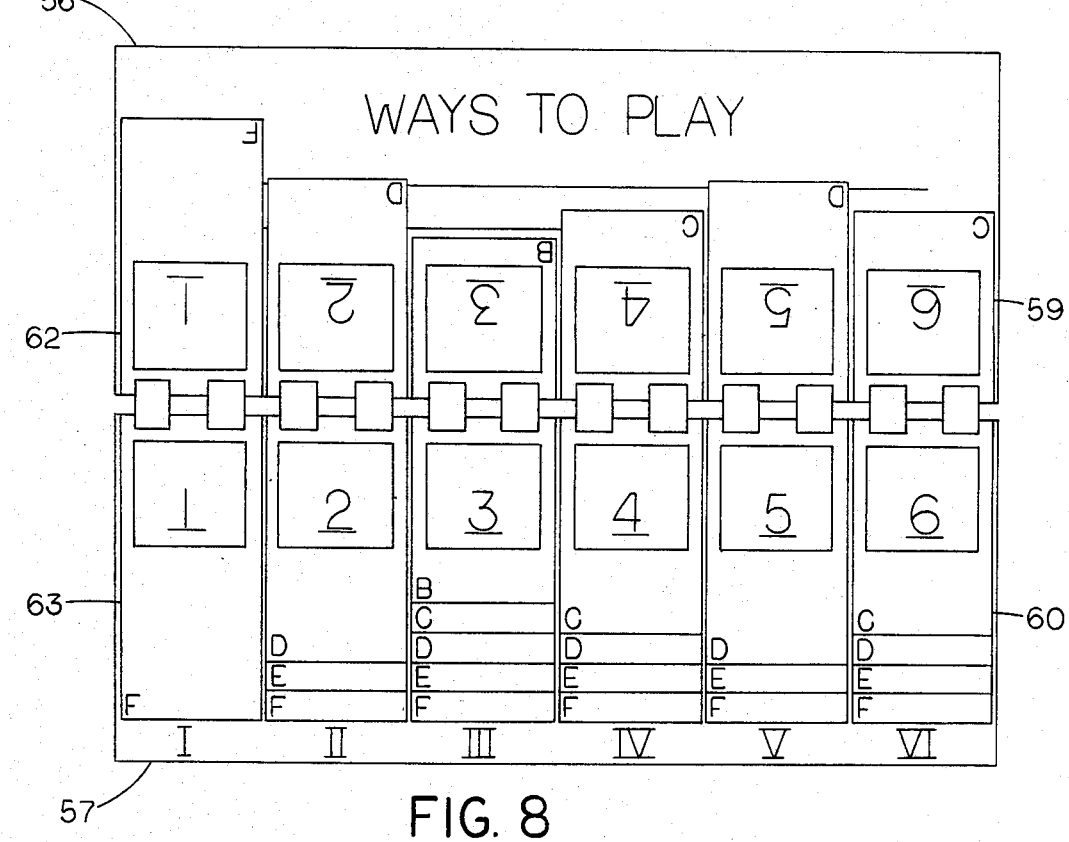
FIG. 8 shows the fixed matrix of the invention in a manner of play according to the invention.

In referring to FIG. 8, it is seen that this player has chosen to select a visual representation from each of the vertical columns about which his story will be told. And his roll of the dice 53 has resulted in a random selection of those representations identified by the ordinals IF, IID, IIIB, IVC, VD, and VIC. These images, or visual representations, are shown in reverse order on the back side of the preceding vertical componet, making it more readily visible to the other players which particular representations are being used in the players telling of his story. Where the player has selected fewer than six vertical columns from which to make selections, and the blank page hereinfore disclosed is incorporated in the matrix, the blank component of the non-selected vertical columns will appear in the visual field rather than a visual representation not included in the telling of the story. Thus, less confusion will result as the players will know for certain what visual representation are included in the story.

As will be appreciated, scoring of the telling of the story can be accomplished in a variety of ways. In general, the player should be rewarded for telling a coherent story using as many of the selected graphics as he can, the more the better. The content of the stories must be agreeable to a majority of the other players. However, it will be appreciated that this is somewhat subjective.

In general, in order for a player to receive points, the player must, within the time limit, use all of the selected graphics informing his story and the story must fit the required category or type of story to be told. If these conditions are met, the player will receive points, depending somewhat upon the number of graphics selected and actually used in the telling of the story. For example, a player will score one point for each picture of visual representation used plus a bonus of two points for each set of six completed.

If the player telling the story does not complete the story in the time period allowed, he may receive no points at all, and the same is true if the story told does not correspond to the type of story to be told. Obviously, instead of receiving no points at all, the scoring can be such that the player will receive only a fewer points than if the story had been completed on time.

In another manner of scoring, and play of the game, if a player uses all six visual representations in telling his story, and does so in the allotted time, the player may roll the dice again and tell a second story. Not only must the player telling the first story meet the requirements with regard to telling the story in the allotted time, and using all of the visual representations selected, he must also tell a story that corresponds to the type of story designated to be told. In most cases, it will be desirable not to have a particular player tell more than two stories in succession, in order to maintain inteest in the game by the other players. The play of the game continues until one player reaches a total score of 50 points. However, it will be appreciated, that players can determine themselves when the game will actually end. The game may end, for example, when each of the players had had the opportunity to tell two or more stories. In that case, the person having the greater number of points is the winner.

ELECTRONIC OR COMPUTERIZED SYSTEM

By a far more sophisticated, though indeed expensive apparatus for carrying out the present system, utilizing modern electronic and computer technology, the photographs of the set disclosed in FIG. 4 of the drawing and described earlier in some detail, or obviously other representations, or even the images directly from original subject matter, may be recorded on video tape or other suitable compact memory or record means providing signals from which the visual representations of the described set may be displayed on the screen of a television type cathode ray tube or other electronic display means, with the images on the screen "manipulated" by the student and supervisor through appropriate controls, in the manner discussed previously.

FIG. 9 by a broad functional diagram represents such a system apparatus. A television type cathode ray tube 10 provides a display field of which a first area 11 is allocated to display of the derived patterns, and a second area 12 allocated to initial display of at least the second and subsequent groups presented to the student, in a random order which most simply is already present in the video tape or other recording of the set of images. The block 10 comprehends as well conventional scanning and beam deflection circuitry for the tube operation.

The first group of the matrix can be initially displayed at the area 11, and there arranged through the controls by the student in desired sequence or order; or it may be initially displayed at the area 12, and then the member images individually shifted by the controls and associated circuitry into the area 11 in elected order, so that the elected pattern is displayed and maintained at 11.

Each subsequent group is initially presented in the area 12 and then shifted into desired position in the prevailing pattern displayed in area 11. After a pattern is completed and the composition signaled by the student, any remaining image displays in the area 12 are extinguished.

Preferably as each element is shifted from 12 into 11, it is extinguished in 12, and preferably also a third or intermediate area 13 is provided into which automatically the display of any image, displayed from the prevailing pattern area 11, is shifted and held in the visual field, until the student is satisfied with and signals completion of the pattern arrangement, though area 12 could be used for this purpose, with images involved in a substitution changing places in 11 and 12.

Of course, though advantageously preserving in the visual field on display all of the members which at any given time are properly to be before the student, until work has been completed, obviously, this requires additional circuitry with consequent expense.

Conveniently the visual representations or images of the entire matrix set are contained in and stored at the storage or memory block 15, by appropriate storage means, as image signal information of, for example, the previously described set of photographs, recorded on appropriate conventional means for example, conveniently a video tape as a primary storage device or source, which of course enables changing among different matrices by merely changing tape reels or sets.

Along therewith intermediate memory storage may be included to hold, for each group of images being presented and for derived patterns, signals obtained from or provided by the primary storage or memory means.

Of course, appropriate signal processing components or circuitry 17 is included for converting signals of selected stored images to produce the display input for the display tube 10.

For example a single-two-or-three gun tube with or without multiplexing circuitry, may be used to produce the two or three areas of display, depending on the character of the circuits used for selecting the image groups and presenting them to the display tube. A general control panel or console 18 and circuitry are provided, not only for overall on-off control of the equipment as a whole, at 18a, but also a section 18b for directing programmed selection circuitry 19 to call up display of the groups, in turn, and finally at 18c controls again operating on the selection circuitry 19 to effect shifts and changes in the display on 10 at the option of the student.

As many different embodiments of this invention will now occur to those skilled in the art, it is to be understood that the specific embodiments of the invention as presented in this patent application are intended by way of illustration only and are not limiting on the invention, but that the limitations thereon should be determined only from the appended claims.

I claim:

1. A method of stimulating operation of associative powers of a subject person and evoking descriptive or narrative response from the subject comprising:
    (a) providing a plurality of different, discrete visual representations arrangeable in a matrix-like array comprising a base group of a plurality of said representations and a plurality of additional groups each of a plurality of different discrete visual representations, and said discrete visual representations in said base group displaying examples of the same concept in at least next adjacent discrete representations and showing a concept in sequence, and said discrete representations in said additional groups displaying no example of the same concept as a group but each said representation in each additional group displaying an example of the same concept as a discrete representation relative to at least one other additional group or said base group;
    (b) manually presenting first to the subject person said base group of discrete and different visual representations from said matrix with members of the base group arranged in a random order,
        in a format permitting the subject person to arrange the said representations as a first visible pattern sequence elected by the subject as a logical order, and
        in the said pattern, subsequently at least, to modify said pattern by substituting representations from said additional groups as presented to establish successive visible patterns;
    (c) requesting the subject person to arrange the base group representations in a logical order as a first visible pattern;
    (d) requesting the subject person to describe what he has done in establishing the pattern, or the significance of that pattern;
    (e) manually presenting to the subject, successsively in a predetermined order, said plurality of additional groups of discrete and different visual representations from the matrix,
        in a format permitting random presentation of the members in each successive additional group, and
        permitting to the subject at least elective substitution of members from each succeedingly presented group for a visual representation in a prevailing said visible pattern of visual representations, and with removal from the visual field of all unused members of each additionally presented group and of members removed from any previously established visible pattern, before presentation of a further group;
    (f) requesting the subject person to substitute members from the newly presented groups as presented for members in the prevailing pattern with which there is a logical connection, to establish a new pattern of discrete, visual representations; and when the subject has completed his effort at substitution to remove from view unused members of each additionally presented group and members from the preexisting pattern as a result of the substitution; and
    (g) requesting the subject to describe each new pattern of visual representations as determined on presentation of each new additional group of a plurality of discrete visual representations, a majority of all said representations being representations of natural persons, animals, or things.

2. A method of stimulating operation of associative powers of a subject person and evoking descriptive or narrative response from the subject according to claim 1 wherein said different discrete visual representations are like-sized cards each bearing a respective visual representation.

* * * * *